United States Patent
Hung

(10) Patent No.: US 10,054,260 B2
(45) Date of Patent: Aug. 21, 2018

(54) ROTATION-ADJUSTABLE HANGING DEVICE

(71) Applicant: Modernsolid Industrial Co., Ltd., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 12 days.

(21) Appl. No.: 15/419,000

(22) Filed: Jan. 30, 2017

(65) Prior Publication Data

US 2017/0219164 A1 Aug. 3, 2017

(30) Foreign Application Priority Data

Feb. 3, 2016 (TW) .............................. 105201714 A

(51) Int. Cl.
| | | |
|---|---|---|
| *F16M 13/00* | (2006.01) | |
| *F16M 13/02* | (2006.01) | |
| *F16B 7/10* | (2006.01) | |
| *F16M 11/08* | (2006.01) | |
| *A61G 12/00* | (2006.01) | |

(52) U.S. Cl.
CPC ........... *F16M 13/027* (2013.01); *F16B 7/105* (2013.01); *F16M 11/08* (2013.01); *A61G 12/004* (2013.01); *F16M 2200/021* (2013.01); *F16M 2200/028* (2013.01); *F16M 2200/063* (2013.01)

(58) Field of Classification Search
CPC .. F16M 11/08; F16M 2200/21; F16M 13/027; F16M 2200/028; F16M 2200/036; A61G 12/004

USPC .......... 248/183.1, 183.2, 186.2, 289.11, 418, 248/919–923

See application file for complete search history.

(56) References Cited

U.S. PATENT DOCUMENTS

| | | | | | |
|---|---|---|---|---|---|
| 2,248,410 | A | * | 7/1941 | Moeller | A47J 45/02 248/224.51 |
| 2,558,058 | A | * | 6/1951 | Nelson | A47J 45/02 248/223.41 |
| 3,576,988 | A | * | 5/1971 | Henning | F21V 21/26 248/289.11 |
| 5,335,970 | A | * | 8/1994 | Bryant | A47C 9/06 248/282.1 |
| 5,743,503 | A | * | 4/1998 | Voeller | F16M 11/08 248/284.1 |
| 5,876,008 | A | * | 3/1999 | Sweere | F16M 11/08 248/280.11 |
| 6,209,830 | B1 | * | 4/2001 | Brotz | F16M 11/14 248/181.2 |
| 6,443,412 | B1 | * | 9/2002 | Kuhn | F16M 11/2014 248/343 |

(Continued)

*Primary Examiner* — Eret C McNichols
(74) *Attorney, Agent, or Firm* — Husch Blackwell LLP

(57) ABSTRACT

A rotation-adjustable hanging device includes a pivot seat, a hanging arm body and a limiting unit. The hanging arm body includes a pivot end connected pivotally to the pivot seat about a first pivot axis. The limiting unit includes a main body, two limiting arms and two limit ends. The main body is disposed on the pivot seat and defines a second axis. The limiting arms are directed toward the pivot end to extend the limit ends to the arm body such that the limit ends are disposed at two opposite sides of a first line that passes through the first and second pivot axes and such that the limit ends is able to stop rotation of the arm body.

9 Claims, 18 Drawing Sheets

(56) References Cited

U.S. PATENT DOCUMENTS

| | | | | |
|---|---|---|---|---|
| 6,601,811 B1* | 8/2003 | Van Lieshout | ........ | F16M 11/08 |
| | | | | 248/282.1 |
| 6,726,167 B2* | 4/2004 | Oddsen, Jr. | ............ | F16M 11/10 |
| | | | | 248/274.1 |
| 6,966,086 B2* | 11/2005 | Metz | .................... | A61G 7/0503 |
| | | | | 248/121 |
| D581,914 S * | 12/2008 | Bures | ........................... | D14/239 |
| 7,467,771 B2* | 12/2008 | McKinney | .......... | E04F 21/1805 |
| | | | | 248/282.1 |
| 7,599,000 B2* | 10/2009 | Lai | ........................ | F16M 11/08 |
| | | | | 348/373 |
| 7,766,297 B2* | 8/2010 | Chih | ...................... | F16M 11/10 |
| | | | | 248/349.1 |
| 7,793,401 B2* | 9/2010 | McKinney | .......... | E04F 21/1805 |
| | | | | 248/228.1 |
| 7,954,777 B2* | 6/2011 | Bohm | .................... | F16M 11/10 |
| | | | | 248/274.1 |
| 7,997,211 B2* | 8/2011 | Peterson | ................ | F16M 11/10 |
| | | | | 108/152 |
| 8,196,883 B2* | 6/2012 | Hirschhorn | .......... | F16M 11/041 |
| | | | | 248/274.1 |
| 8,408,505 B2* | 4/2013 | Ye | .......................... | F16M 11/08 |
| | | | | 248/161 |
| 8,794,579 B2* | 8/2014 | Sturman | .............. | F16M 11/105 |
| | | | | 248/160 |
| 9,416,912 B2* | 8/2016 | Grziwok | ............ | F16M 11/2014 |
| 9,476,543 B2* | 10/2016 | Cornelius | .............. | F16M 11/08 |
| 2007/0195495 A1* | 8/2007 | Kim | .................... | F16M 11/105 |
| | | | | 361/679.07 |
| 2008/0116328 A1* | 5/2008 | Wang | .................... | F16M 11/08 |
| | | | | 248/122.1 |

* cited by examiner

ROTATION-ADJUSTABLE HANGING DEVICE

CROSS-REFERENCE TO RELATED APPLICATION

This application claims priority to Taiwanese Patent Application No. 105201714, filed on Feb. 3, 2016.

FIELD

The disclosure relates to a hanging device, and more particularly to a rotation-adjustable hanging device.

BACKGROUND

Referring to FIGS. 1 and 2, an existing rotatable hanging device includes a connection seat 13, a mounting rod 11 upstanding from the connection seat 13, a first support arm 12 pivotally disposed on the connection seat 13 and spaced apart from the mounting rod 11, and a second support arm 14 rotatably extending from the first support arm 12 and having an end for mounting a display 15. Because the first support arm 12 stops rotating when abutting against the mounting rod 11, the first support arm 12 is rotatable within a relatively large angle relative to the connection seat 13. Further, since the second support arm 14 is movable along with and rotatable relative to the first support arm 12, the display 15 at the end of the second support arm 14 has a much larger rotation angle compared to that of the first support arm 12. However, in practice, the position of the display 15 need not change much, and the display 15 does not require a relatively large space for the movement thereof. Further, a wide movement range is unsuitable for installing the display 15 in a small space, on a single wall, or at a corner because the display 15 may easily be subjected to a collision force. In addition, it may be inconvenient to adjust the display 15 to an appropriate position.

SUMMARY

Therefore, an object of the disclosure is to provide a rotation-adjustable hanging device that can alleviate the drawbacks of the prior art.

According to the disclosure, a rotation-adjustable hanging device includes a pivot seat, a hanging arm and a limiting unit.

The hanging arm includes an arm body that has a pivot end and a connector end opposite to the pivot end. The pivot end is connected pivotally to the pivot seat and pivotable about a first pivot axis.

The limiting unit includes a main body, two limiting arms extending outward from two opposite sides of the main body, and two limit ends respectively disposed on the limiting arms distally of the main body. The main body is disposed on the pivot seat and defines a second pivot axis that is spaced apart from the first pivot axis. The limiting arms is directed toward the pivot end to extend the limit ends to the arm body such that the limit ends are disposed at two opposite sides of a first line that passes through the first and second pivot axes and such that the limit ends is able to stop rotation of the arm body.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
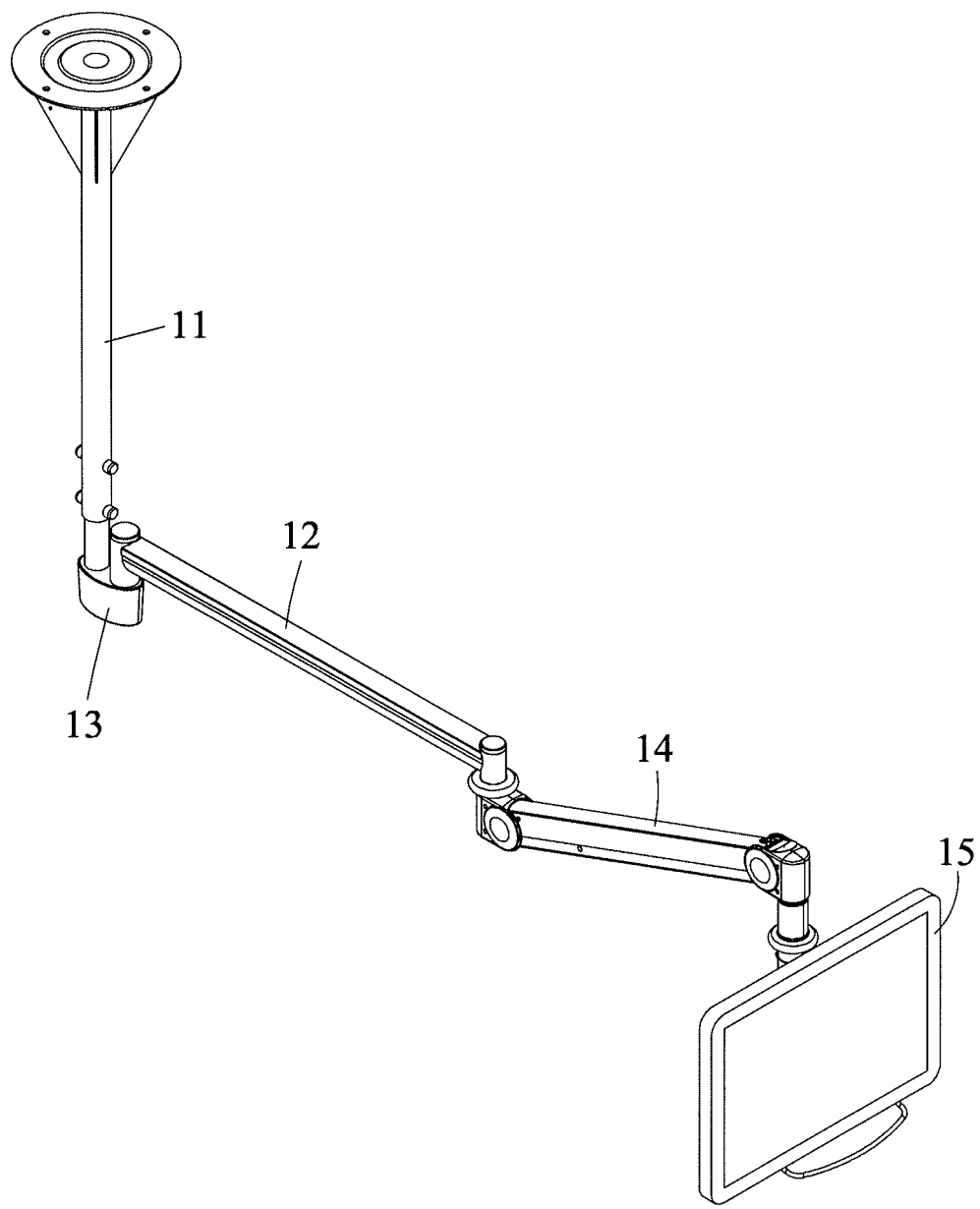
FIG. 1 is a perspective view of an existing rotatable hanging device.
Figure 2:
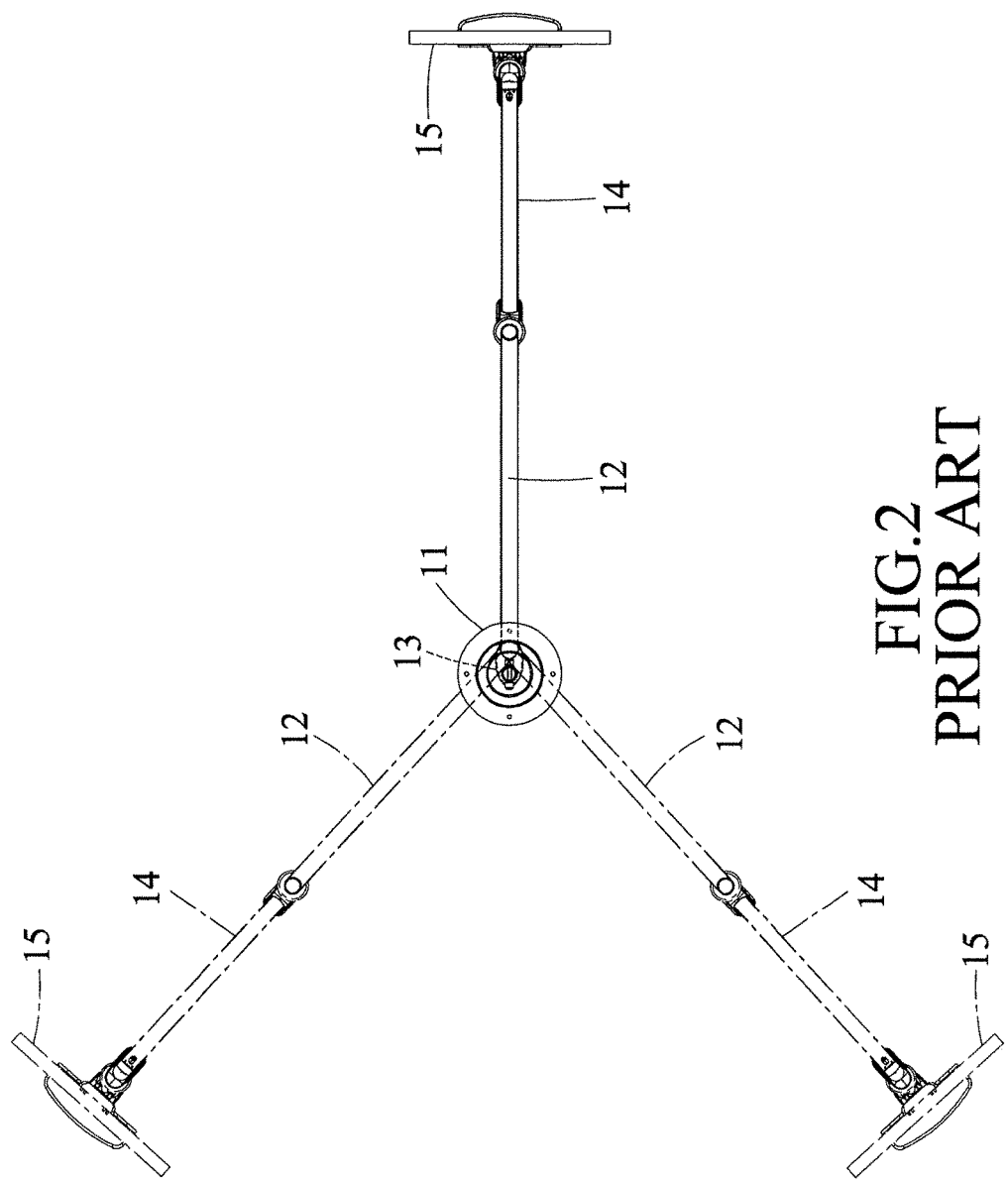
FIG. 2 is a top view of the existing rotatable hanging device.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 3 to 6, a rotation-adjustable hanging device according to a first embodiment of the disclosure includes a pivot seat 2, a hanging arm 3, a limiting unit 4, and a post 6.

The pivot seat 2 includes a seat body 21, a spindle 22 centered at a first pivot axis (A) and upstanding from the seat body 21, and a support rod 23 upstanding from the seat body 21 and centered at a second pivot axis (B) that is parallel to and spaced apart from the first pivot axis (A).

The hanging arm 3 includes an arm body 31 that has a pivot end 32 and a connector end 33 opposite to the pivot end 32. The pivot end 32 is pivotally disposed on the spindle 22 and is pivotable about the first pivot axis (A). The arm body 31 is rotatable when being pushed by an external force.

Figure 3:
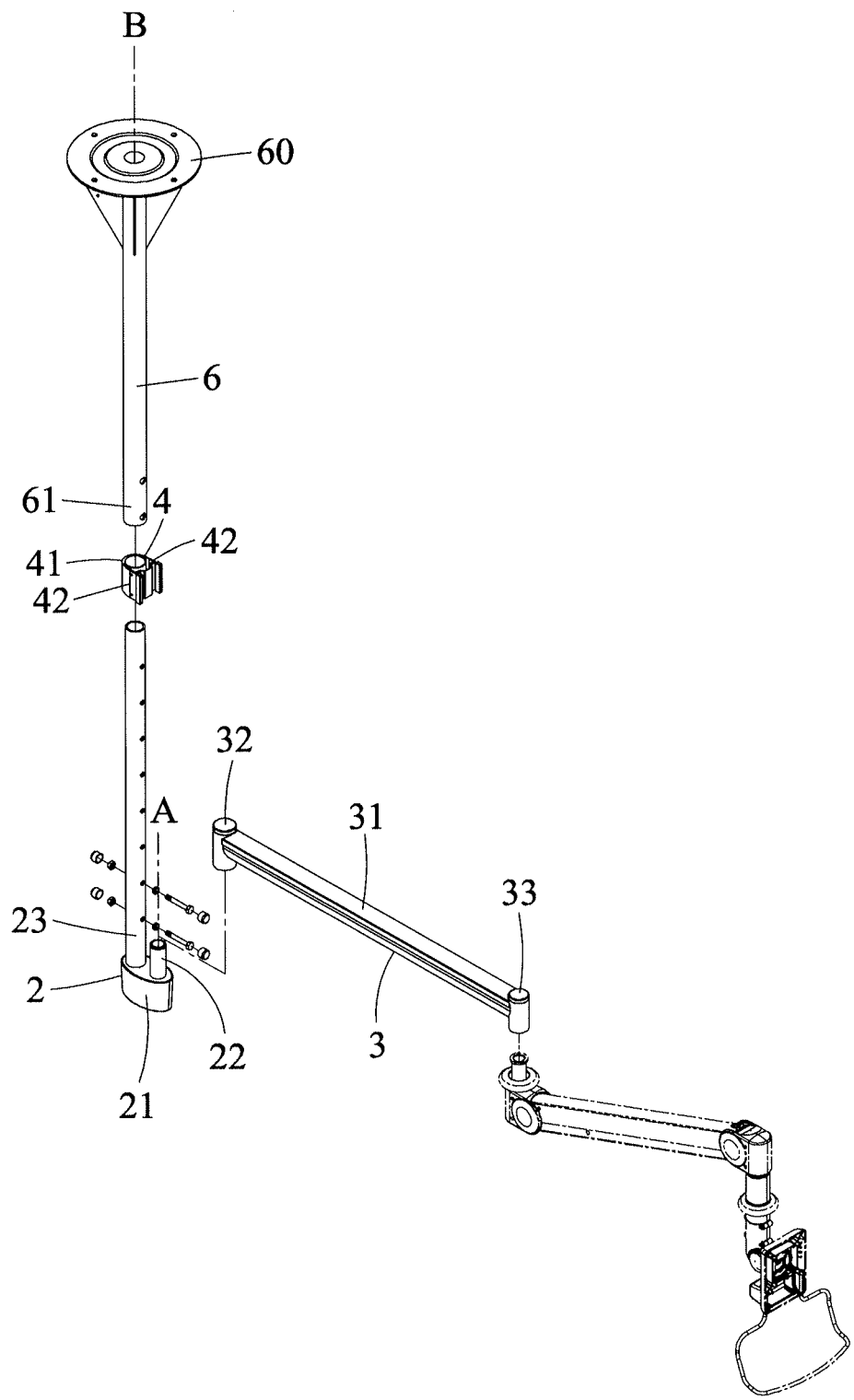
FIG. 3 is an exploded perspective view of a rotation-adjustable hanging device according to a first embodiment of the present disclosure.
Figure 4:
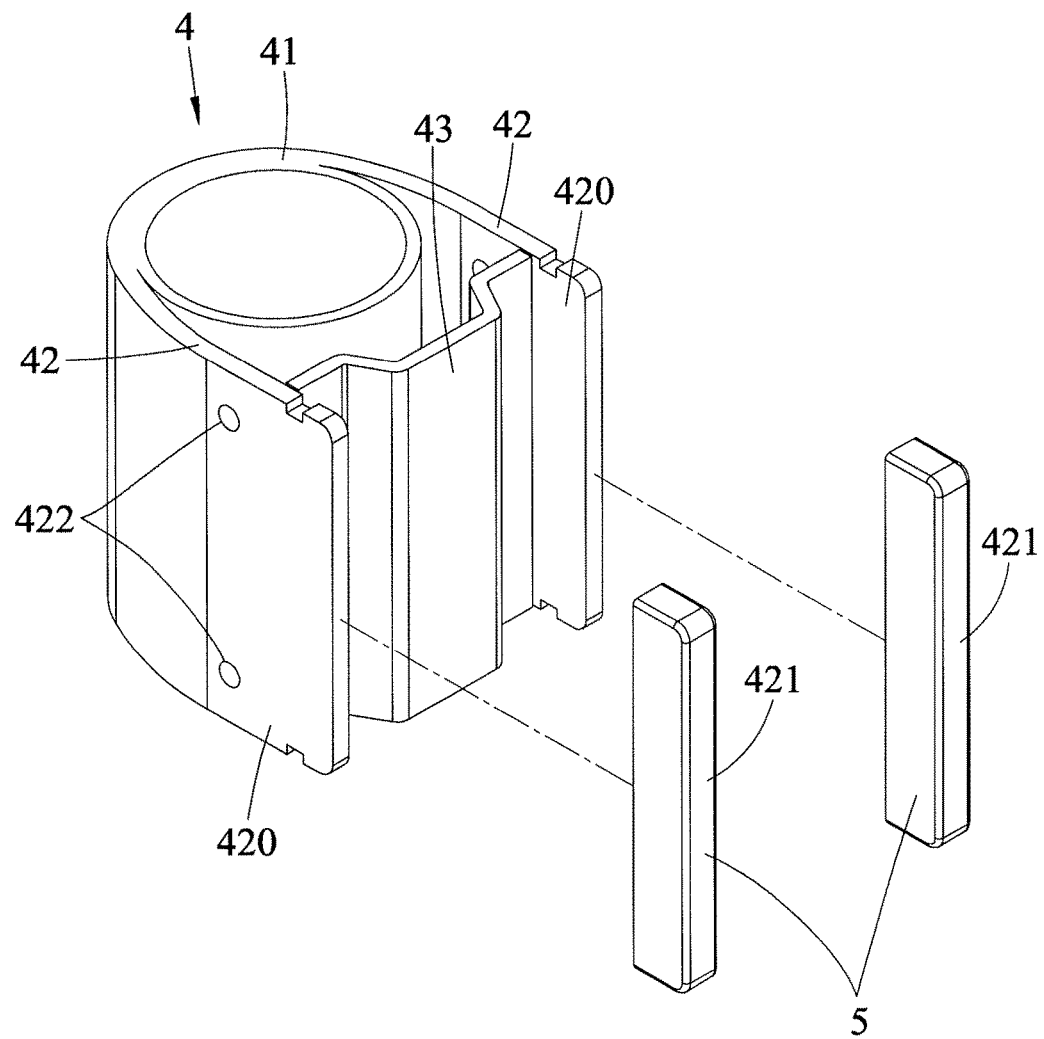
FIG. 4 is an enlarged perspective view, illustrating a limiting unit of the first embodiment.
Figure 5:
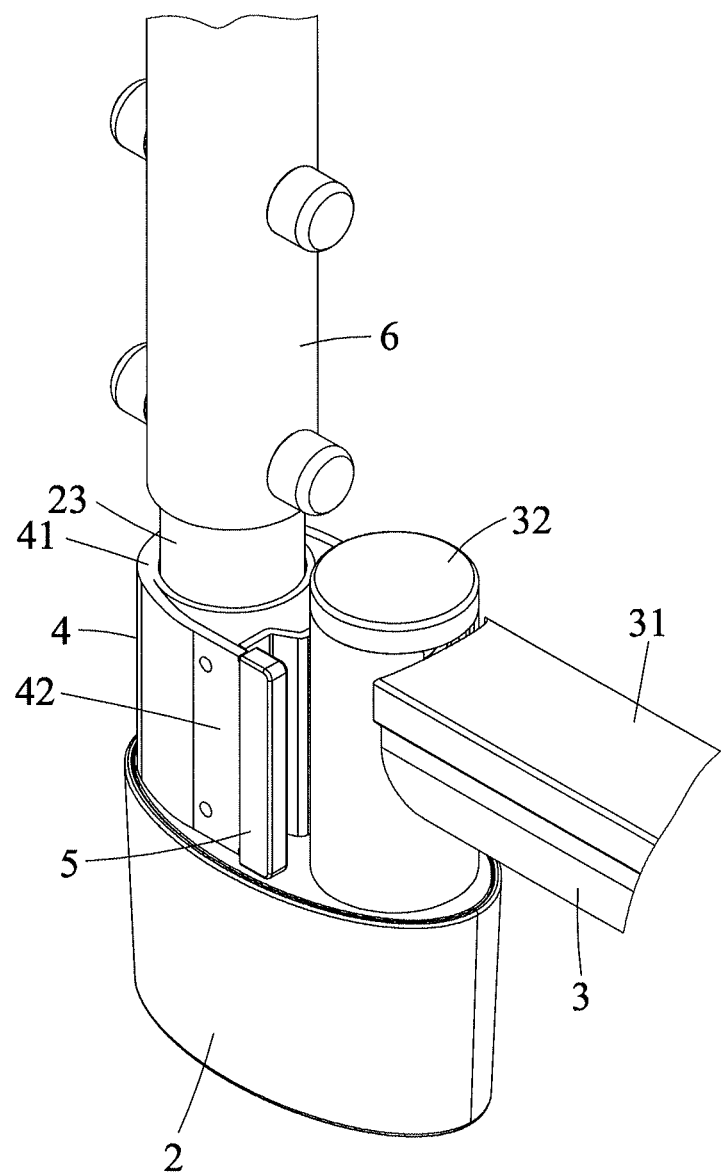
FIG. 5 is a fragmentary perspective view of the first embodiment.
Figure 6:
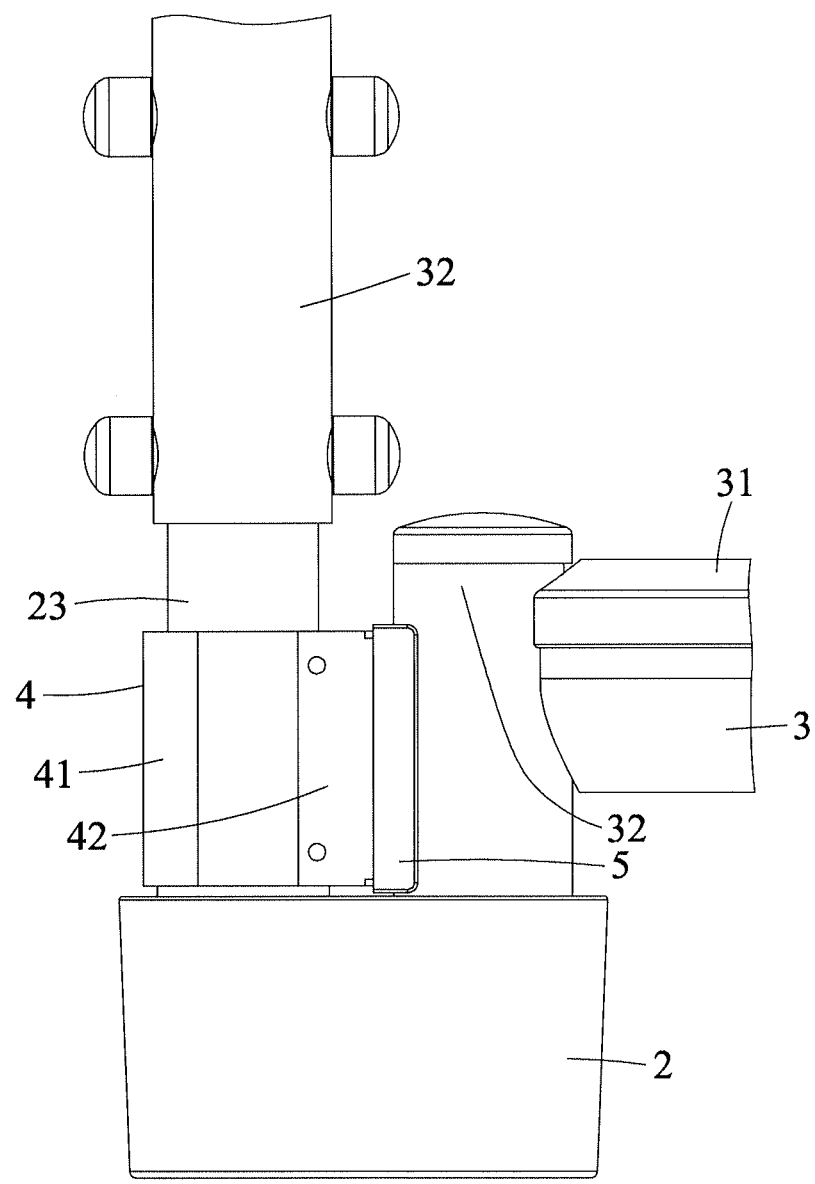
FIG. 6 is a fragmentary side view of the first embodiment.

In addition, as shown in FIG. 3, the connector end 33 is suitable for connecting another rod body or an object thereto.

The limiting unit 4 includes a main body 41, two limiting arms 42 extending outward from two opposite sides of the main body 41, two limit ends 420 disposed respectively on the limiting arms 42 distally of the main body 41, and a reinforcement portion 43 bridging the limiting arms 42. In this embodiment, the main body 41, the limiting arms 42 and the reinforcement portion 43 are made of a metal material.

The main body 41 is hollow and defines the second pivot axis (B). In this embodiment, the main body 41 is disposed pivotally and removably around the support rod 23 and abuts against the seat body 21. The limiting arms 42 are symmetrical to each other with respect to the main body 41.

The post 6 is sleeved around and telescopically connected to the support rod 23. In this embodiment, the post 6 has a distal end 60 to be fixed on a horizontal surface such as a surface of a roof ceiling, and a connection end 61 opposite to the distal end 60 and connected to the support rod 23. Through the use of the post 6, the position of the seat body 21 is adjustable relative to the level of the distal end 60 of the post 6.

Referring back to FIG. 4, the rotation-adjustable hanging device further includes two protective caps 5. Each protective cap 5 is made of a plastic material, and is fitted on one of the limit ends 420, and has a contact surface 421.

Figure 7:
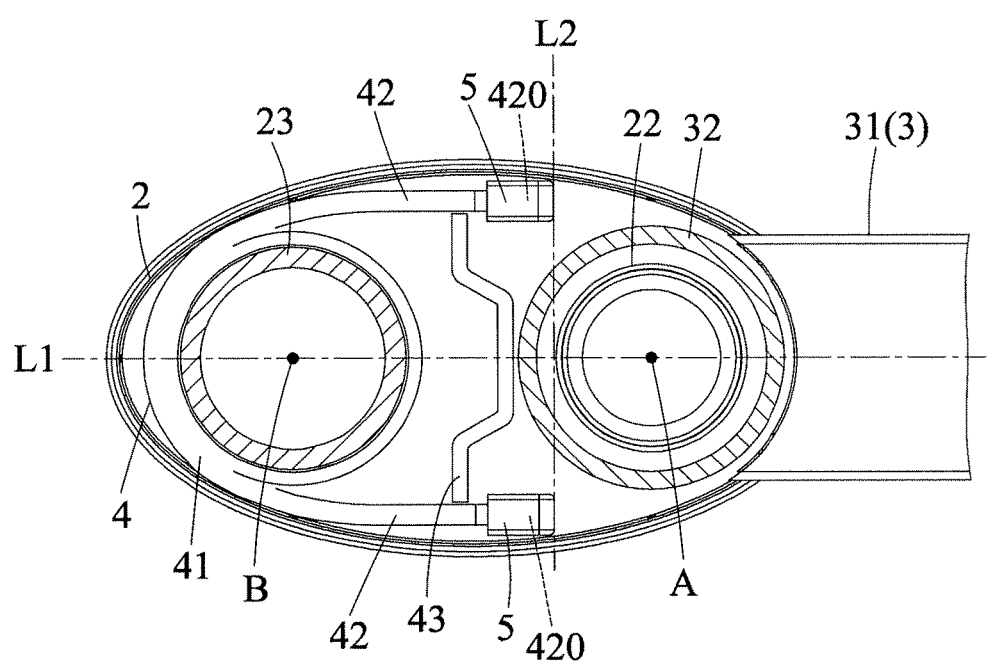
FIG. 7 is a top fragmentary sectional view, illustrating a hanging arm, a protective cap and a limiting unit of the first embodiment.

Referring to FIG. 7, the limiting arms 42 are directed horizontally toward the pivot end 32 to extend the limit ends 420 to the arm body 31, such that the limit ends 420 are disposed at two opposite sides of a first line (L1) that passes through the first and second pivot axes (A, B) and such that the limit ends 420 is able to stop rotation of the arm body 31. The pivot end 32 of the arm body 31 has a portion disposed between the limit ends 420 such that a second line (L2) interconnecting the limit ends 420 intersects the pivot end 32. The main body 41 and the support rod 23 are not press fitted to each other. Thus, the limiting arms 42 are rotatable relative to the support rod 23.

Figure 8:
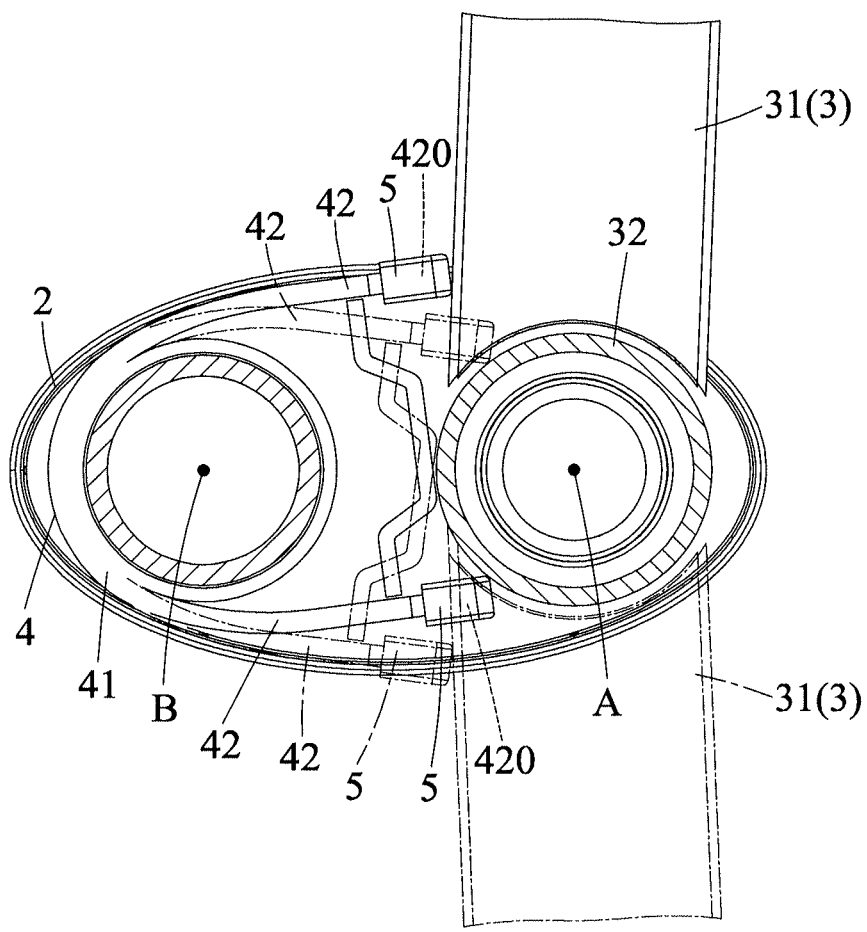
FIG. 8 is a view similar to FIG. 7, but illustrating the hanging arm that is stopped by the limiting unit of the first embodiment.

Because the pivot end 32 of the arm body 31 partially extends between the limit ends 420, it can interfere clockwise or counter-clockwise rotation movements the limit ends 420. Referring to FIG. 8, when the arm body 31 rotates counter-clockwise about the first pivot axis (A) and collides the upper limit end 420, as the lower limit end 420 is stopped by the pivot end 32, counter-clockwise rotations of the upper limit end 420 and the arm body 31 are limited. When the arm body 31 rotates clockwise and collides the lower limit end 420, as the upper limit end 420 is stopped by the pivot end 32, clockwise rotations of the lower limit end 420 and the arm body 31 are limited. Therefore, the limiting arms 42 and the limit ends 420 provide the function of limiting the rotation angle of the arm body 31. On the other hand, although the limiting arms 42 are rotatable, they rotate limitedly. That is to say, the limiting arms 42 and the limit ends 420 can only swing limitedly.

When the arm body 31 collides the limit end 420 disposed on one of the limiting arms 42, because the limiting arms 42 bridged by the reinforcement portion 43, they are reinforced to resist collision.

The contact surface 421 of each protective cap 5 may be arranged to be substantially parallel to the surface of the arm body 31 so as to have a face-to-face contact with the arm body 31 when the arm body 31 contacts the contact surface 421. The adjustment rotation angle of the hanging arm 3 in this embodiment is in a range of smaller than 180°.

Figure 9:
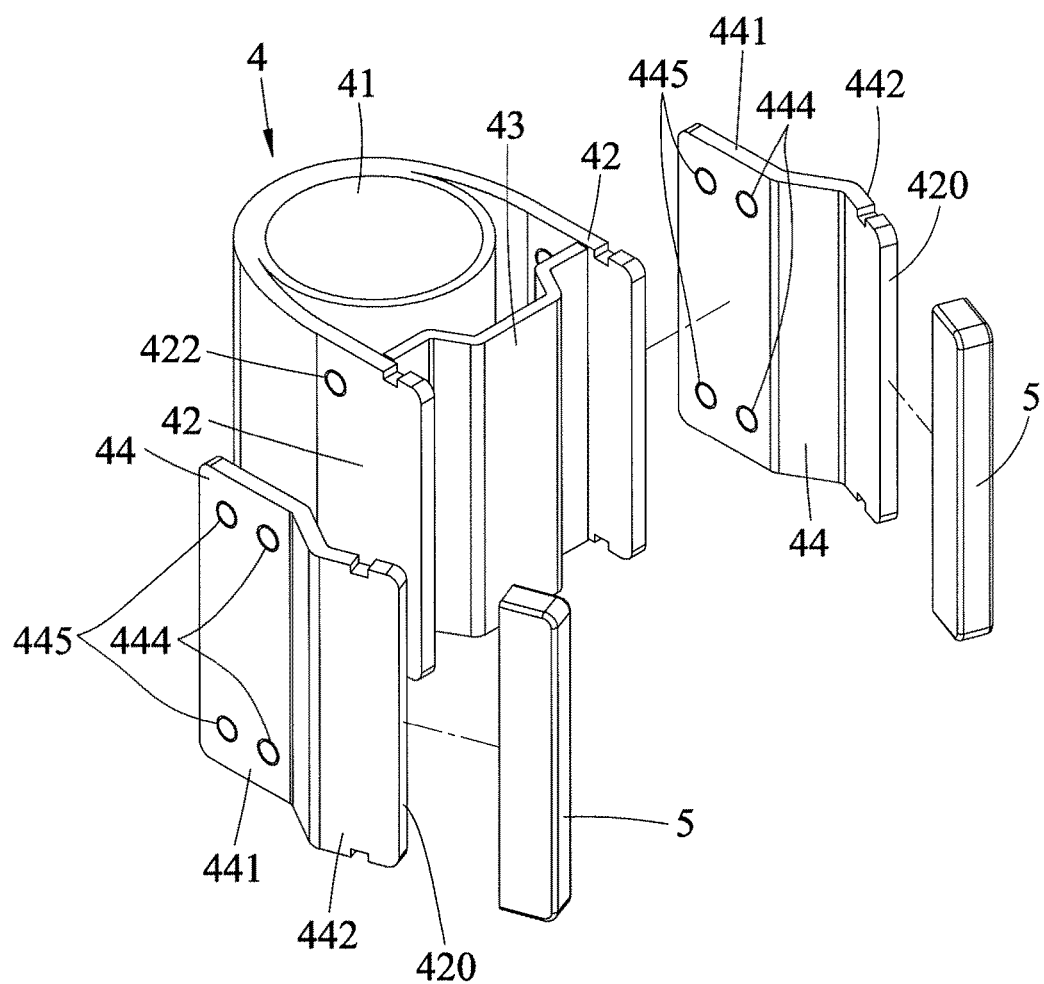
FIG. 9 is an exploded perspective view of a rotation-adjustable hanging device according to a second embodiment of the disclosure in a fully disassembled state.
Figure 10:
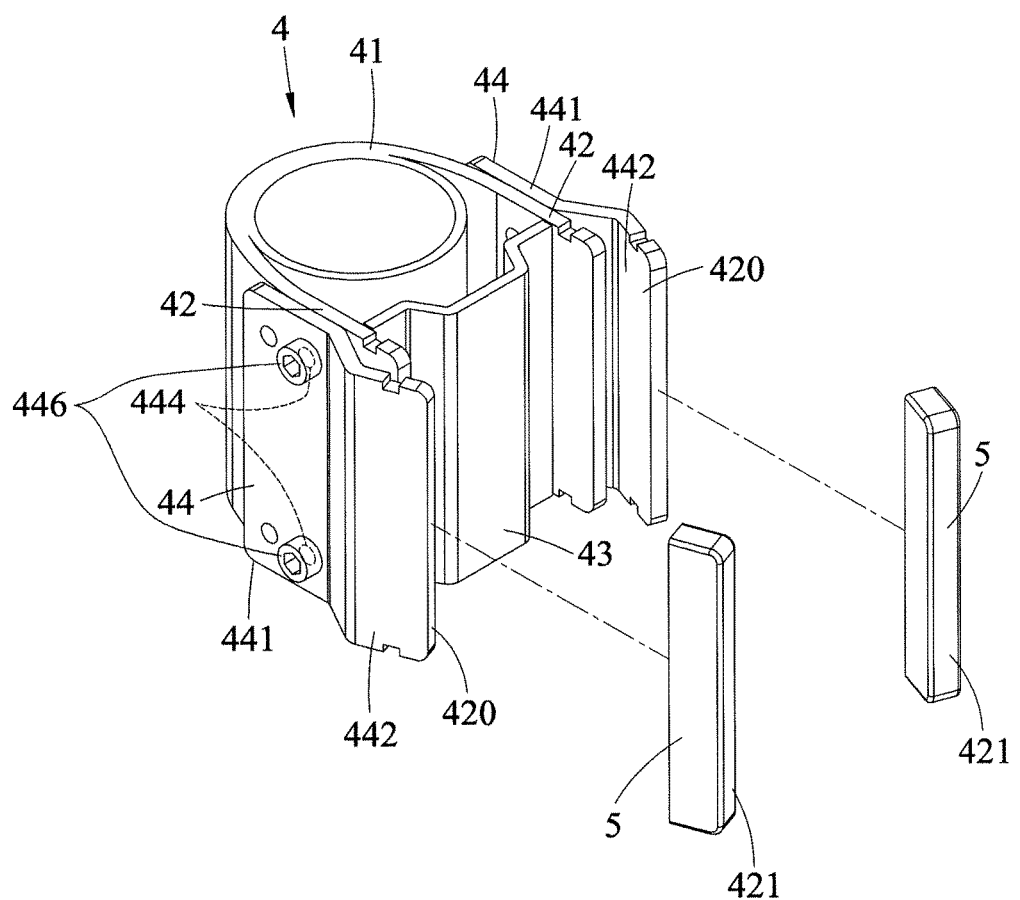
FIG. 10 is a view similar to FIG. 9, but illustrating the rotation-adjustable hanging device that has extending plates in an assembled state.

FIG. 9 illustrates a rotation-adjustable hanging device according to a second embodiment of the disclosure, which has a structure generally similar to that of the first embodiment. However, in the second embodiment, each limiting arm 42 has a row of mounting holes 422, and the limiting unit 4 further includes two extending plates 44 and a plurality of fasteners 446.

Each extending plate 44 is made of a metal material, and has a fixing segment 441 detachably fixed to a respective one of the limiting arms 42, and a stop segment 442 bending and extending outward from the fixing segment 441. The stop segment 442 of each extending plate 44 has one of the limit ends 420, and each protective cap 5 is disposed on one of the limit ends 420.

The fixing segment 441 has multiple rows of connection holes 444, 445. A selected one of the rows of the connection holes 444, 445 is alignable with the row of the mounting holes 422 of the respective limiting arm 42. In this embodiment, the number of the connection holes 444, 445 in each row is two, and the number of the mounting holes 422 is two. The row of the connection holes 444 is proximate to the stop segment 442. The row of the connection holes 445 is away from the stop segment 442.

Referring to FIGS. 10 to 13, the fasteners 446 extend through the connection holes 444 and the mounting holes 422, thereby securing each extending plate 44 to the respective limiting arm 42. Because each stop segment 442 is designed to have a bending angle relative to the fixing segment 441 or the respective limiting arm 42, the rotation angle of the arm body 31 is within a range of smaller than 135°.

Figure 11:
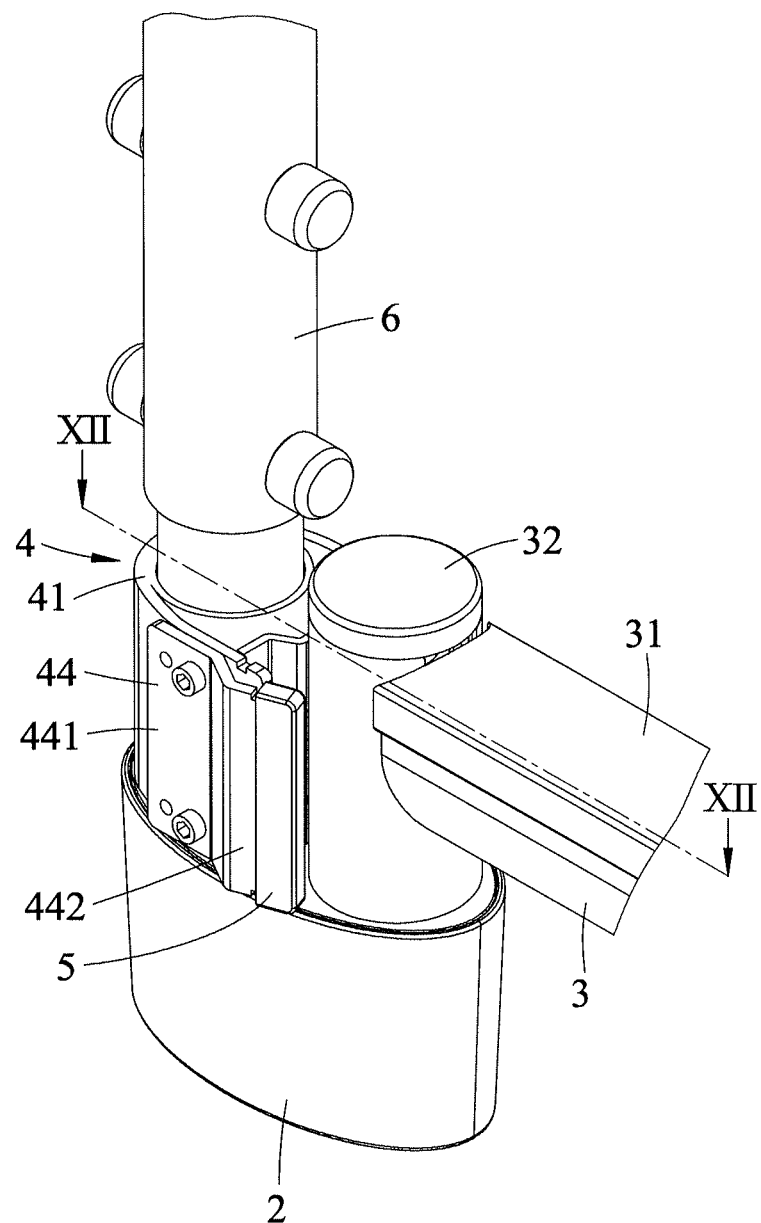
FIG. 11 is a fragmentary perspective view of the second embodiment.
Figure 12:
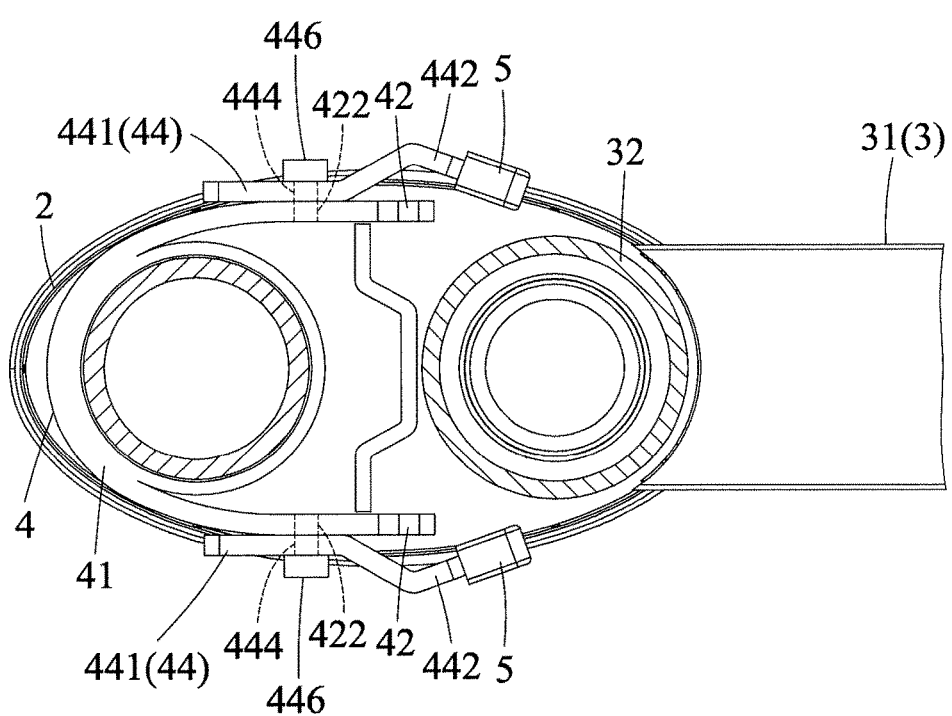
FIG. 12 is a top fragmentary sectional view taken along line XII-XII of FIG. 11, illustrating a hanging arm, a protective cap and a limiting unit of the second embodiment.
Figure 13:
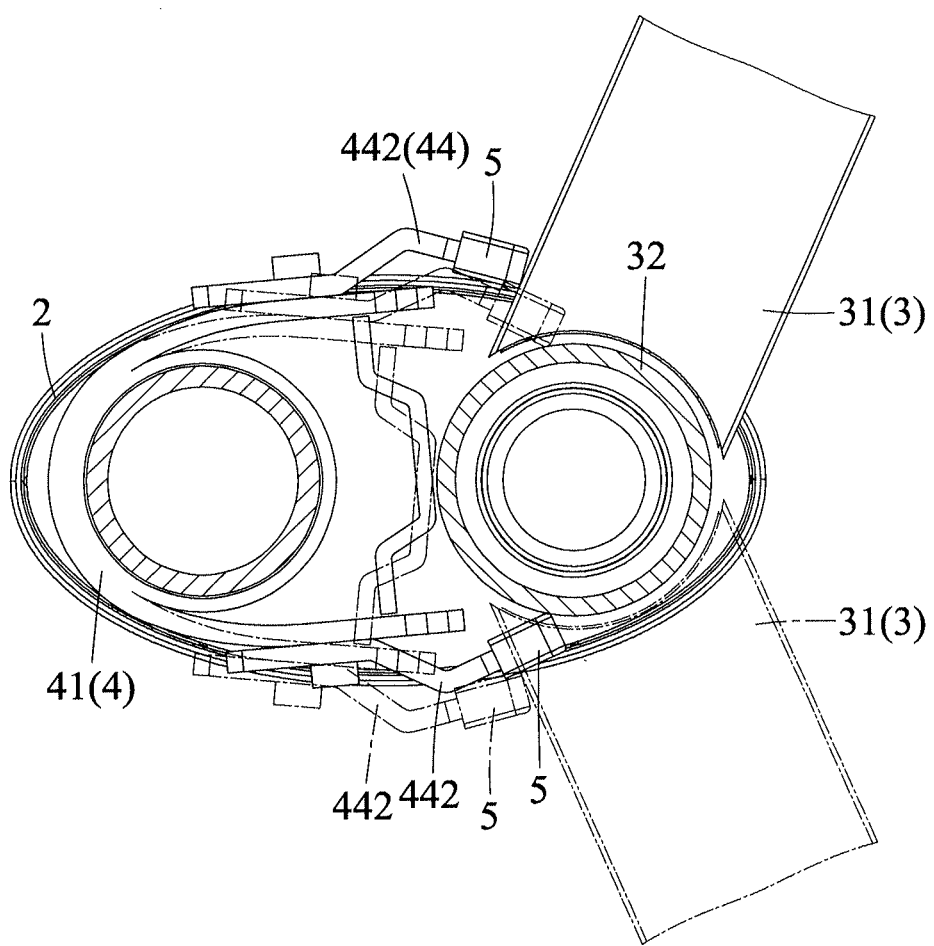
FIG. 13 is a view similar to the FIG. 12, but illustrating the hanging arm that is stopped by the limiting unit of the second embodiment.
Figure 14:
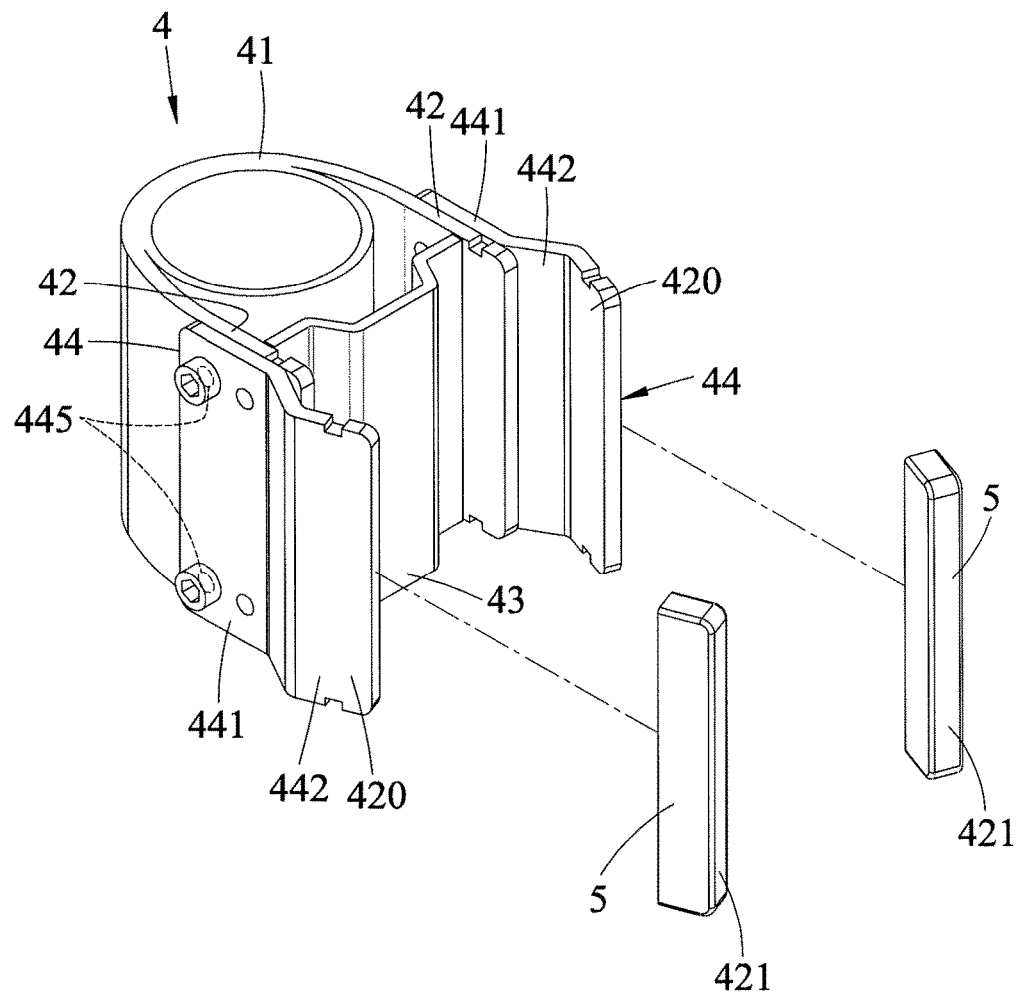
FIG. 14 is a view similar to FIG. 10, but illustrating that the extending plates are changed in position.
Figure 15:
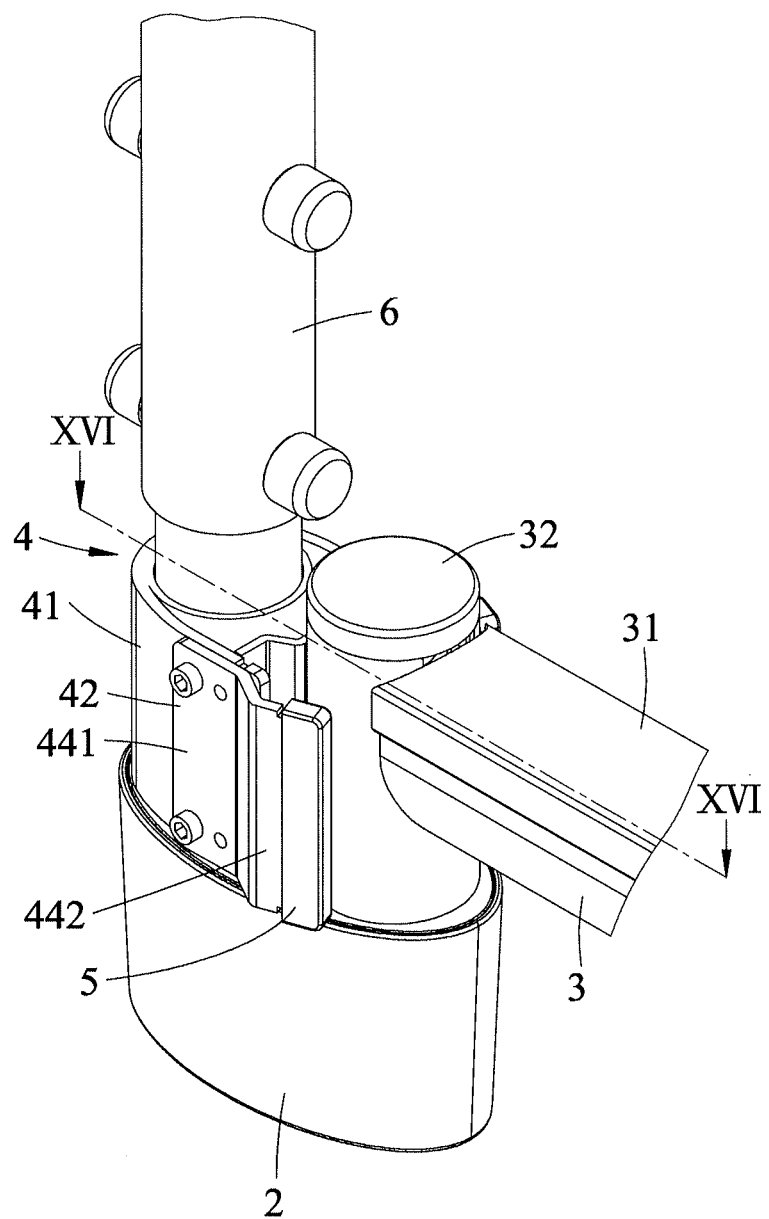
FIG. 15 is similar to FIG. 11, but illustrating that the extending plates are changed in position.
Figure 16:
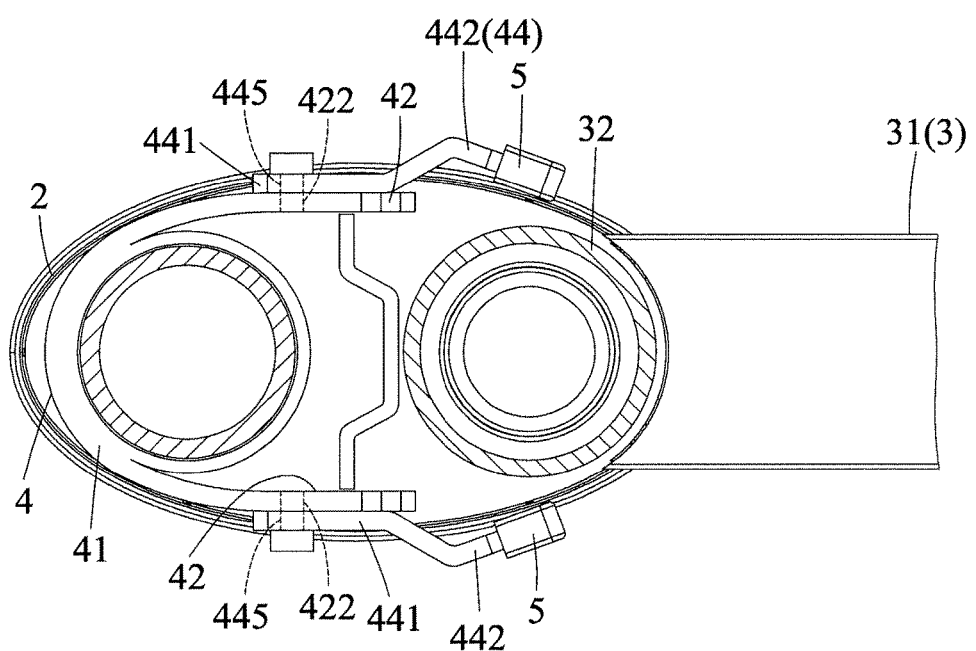
FIG. 16 is a top fragmentary sectional view taken along line XVI-XVI of FIG. 15.
Figure 17:
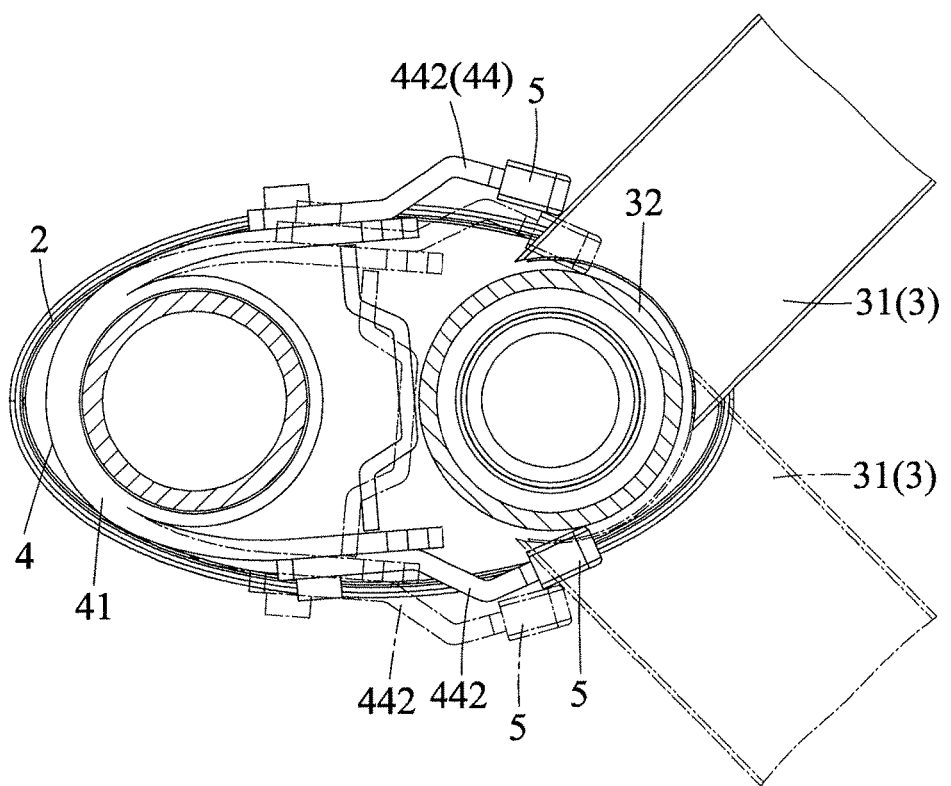
FIG. 17 is a view similar to FIG. 16, but illustrating the hanging arm that is stopped by the limiting unit of the second embodiment.

Referring to FIGS. 14 to 17, when each fastener 446 extend through one of the selected connection holes 445 and one of the mounting holes 422 for securing one of the extending plates 44 to the respective limiting arm 42, each limit end 420 is more closer to the arm body 31 than that shown in FIGS. 11 and 12. In this situation, the rotation angle of the hanging arm 3 is within a range of about 90°.

While two extending plates 44 are respectively disposed on the limiting arms 42 in the embodiment, the invention may also be implemented by disposing one extending plate 44 on only one of the limiting arms 42.

Figure 18:
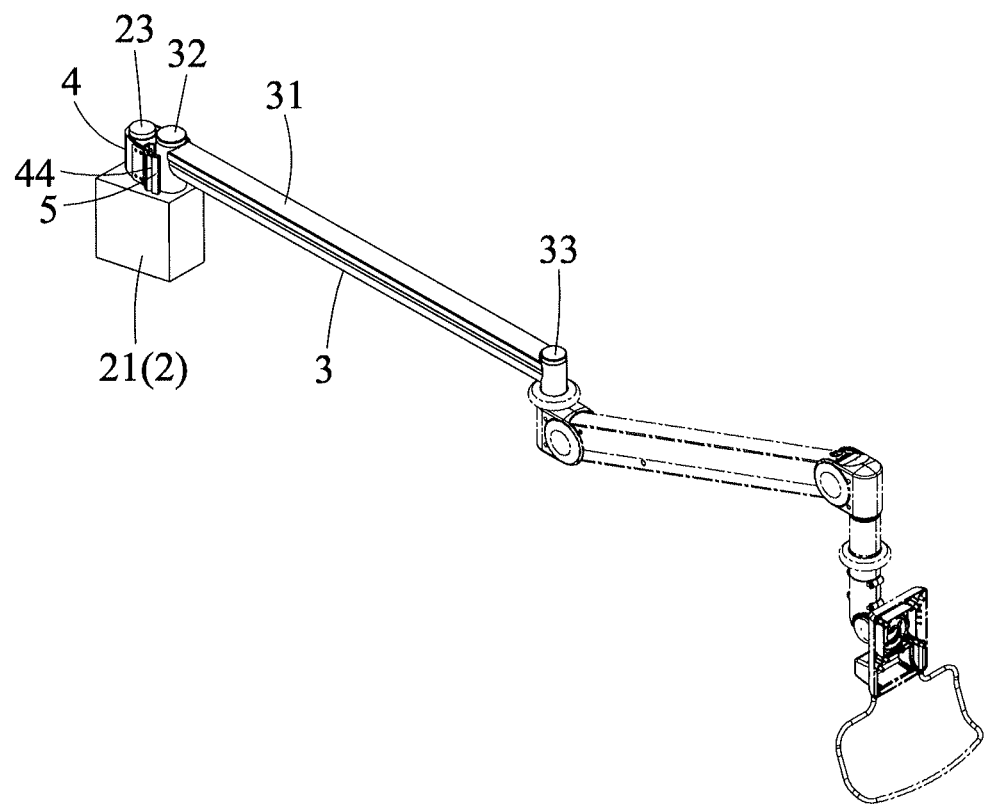
FIG. 18 is a perspective view of a rotation-adjustable hanging device according to a third embodiment of the present disclosure.

FIG. 18 illustrates a rotation-adjustable hanging device according to a third embodiment of the disclosure, which has a structure generally similar to that of the first embodiment. However, in the third embodiment, the post 6 is dispensed with, and the length of the support rod 23 is shortened. The rotation-adjustable hanging device of the third embodiment is suitable for being fixed on a platform or a wall surface.

From the aforesaid description, the advantages of this disclosure can be summarized as follows:

1. Since the main body 41 and the support rod 23 are not press fitted to each other, the main body 41 can be easily installed, or replaced. In addition, adjustment of the rotation angle is easy by using the extending plates 44.

2. Because the main body 41, the limiting arms 42 and the extending plates 44 are metal, they are robust. Further, because the protective caps 5 are plastic, they can absorb shock.

3. Because the limiting arms 42 and the limit ends 420 extend toward the arm body 31, the protective caps 5 are able to face-to-face contact the arm body 31 for receiving stresses. As such, the stresses may be dispersed, and damages caused by hitting edges may be avoided.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered in the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A rotation-adjustable hanging device comprising:
   a pivot seat (2);
   a hanging arm (3) including an arm body (31) that has a pivot end (32) and a connector end (33) opposite to said pivot end (32), said pivot end (32) being connected pivotally to said pivot seat (2) and pivotable about a first pivot axis (A); and
   a limiting unit (4) including a main body (41), two limiting arms (42) extending outward from two opposite sides of said main body (41), and two limit ends (420) respectively disposed on said limiting arms (42) distally of said main body (41), said main body (41) being disposed pivotally on said pivot seat (2) and defining a second pivot axis (B) that is spaced apart from the first pivot axis (A), said limiting arms (42) being directed toward said pivot end (32) to extend said limit ends (420) to said arm body (31) such that said limit ends (420) are disposed at two opposite sides of a first line (L1) that passes through said first and second pivot axes (A, B) and such that said limit ends (420) are able to stop rotation of said arm body (31),
   wherein the pivot end 32 of the arm body 31 has a portion disposed between the limit ends 420 such that a second line (L2) interconnecting the limit ends 420 intersects the pivot end 32.

2. The rotation-adjustable hanging device as claimed in claim 1, wherein said main body (41) is disposed removably on said pivot seat (2).

3. The rotation-adjustable hanging device as claimed in claim 1, wherein said limiting unit (4) further includes at least one extending plate (44) detachably disposed on at least one of said limiting arms (42), at least one of said limit ends (420) being disposed on said at least one of said extending plate (44).

4. The rotation-adjustable hanging device as claimed in claim 3, said at least one extending plate (44) has a fixing segment (441) detachably fixed to said at least one of said limiting arms (42), and a stop segment (442) bending and extending outward from said fixing segment (441), said stop segment having said at least one of said limit ends (420) disposed thereon.

5. The rotation-adjustable hanging device as claimed in claim 4, wherein:
   said at least one of said limiting arms (42) has a row of mounting holes (422);
   said fixing segment (441) has multiple rows of connection holes (444, 445), a selected one of said rows of said connection holes (444, 445) being alignable with said row of said mounting holes (442); and
   said limiting unit further includes a plurality of fasteners (426) extending through the selected one of said rows of said connection holes (444, 445) and said row of said mounting holes (442).

6. The rotation-adjustable hanging device as claimed in claim 1, wherein:
   said pivot seat (2) includes a seat body (21), a spindle (22) centered at the first pivot axis (A) and upstanding from said seat body (21), and a support rod (23) centered at the second pivot axis (B) and upstanding from said seat body (21);
   said pivot end (32) of said arm body (31) is pivotally disposed on said spindle (22); and
   said main body (41) of said limiting unit (4) is disposed pivotally and removably around said support rod (23).

7. The rotation-adjustable hanging device as claimed in claim 6, further comprising a post (6) telescopically connected to said support rod (23).

8. A rotation-adjustable hanging device comprising,
   a pivot seat (2);
   a hanging arm (3) including an arm body (31) that has a pivot end (32) and a connector end (33) opposite to said pivot end (32), said pivot end (32) being connected pivotally to said pivot seat (2) and pivotable about a first pivot axis (A); and
   a limiting unit (4) including a main body (41), two limiting arms (42) extending outward from two opposite sides of said main body (41), and two limit ends (420) respectively disposed on said limiting arms (42) distally of said main body (41), said main body (41) being disposed on said pivot seat (2) and defining a second pivot axis (B) that is spaced apart from the first pivot axis (A), said limiting arms (42) being directed toward said pivot end (32) to extend said limit ends (420) to said arm body (31) such that said limit ends (420) are disposed at two opposite sides of a first line (L1) that passes through said first and second pivot axes (A, B) and such that said limit ends (420) are able to stop rotation of said arm body (31),
   wherein said limiting unit (4) further includes a reinforcement portion (43) bridging said limiting arms (42).

9. A rotation-adjustable hanging device comprising,
   a pivot seat (2);
   a hanging arm (3) including an arm body (31) that has a pivot end (32) and a connector end (33) opposite to said pivot end (32), said pivot end (32) being connected pivotally to said pivot seat (2) and pivotable about a first pivot axis (A);
   a limiting unit (4) including a main body (41), two limiting arms (42) extending outward from two opposite sides of said main body (41), and two limit ends (420) respectively disposed on said limiting arms (42) distally of said main body (41), said main body (41) being disposed on said pivot seat (2) and defining a second pivot axis (B) that is spaced apart from the first pivot axis (A), said limiting arms (42) being directed toward said pivot end (32) to extend said limit ends (420) to said arm body (31) such that said limit ends (420) are disposed at two opposite sides of a first line (L1) that passes through said first and second pivot axes (A, B) and such that said limit ends (420) are able to stop rotation of said arm body (31); and
   at least one protective cap (5) fitted on at least one of said limit ends (420), said at least one protective cap (5)

being made of a plastic material, said main body (41) and said limiting arms (42) being made of a metal material.

\* \* \* \* \*